(No Model.)
W. B. LIVERMORE.
APPARATUS FOR DRAWING WATER.
No. 594,956. Patented Dec. 7, 1897.
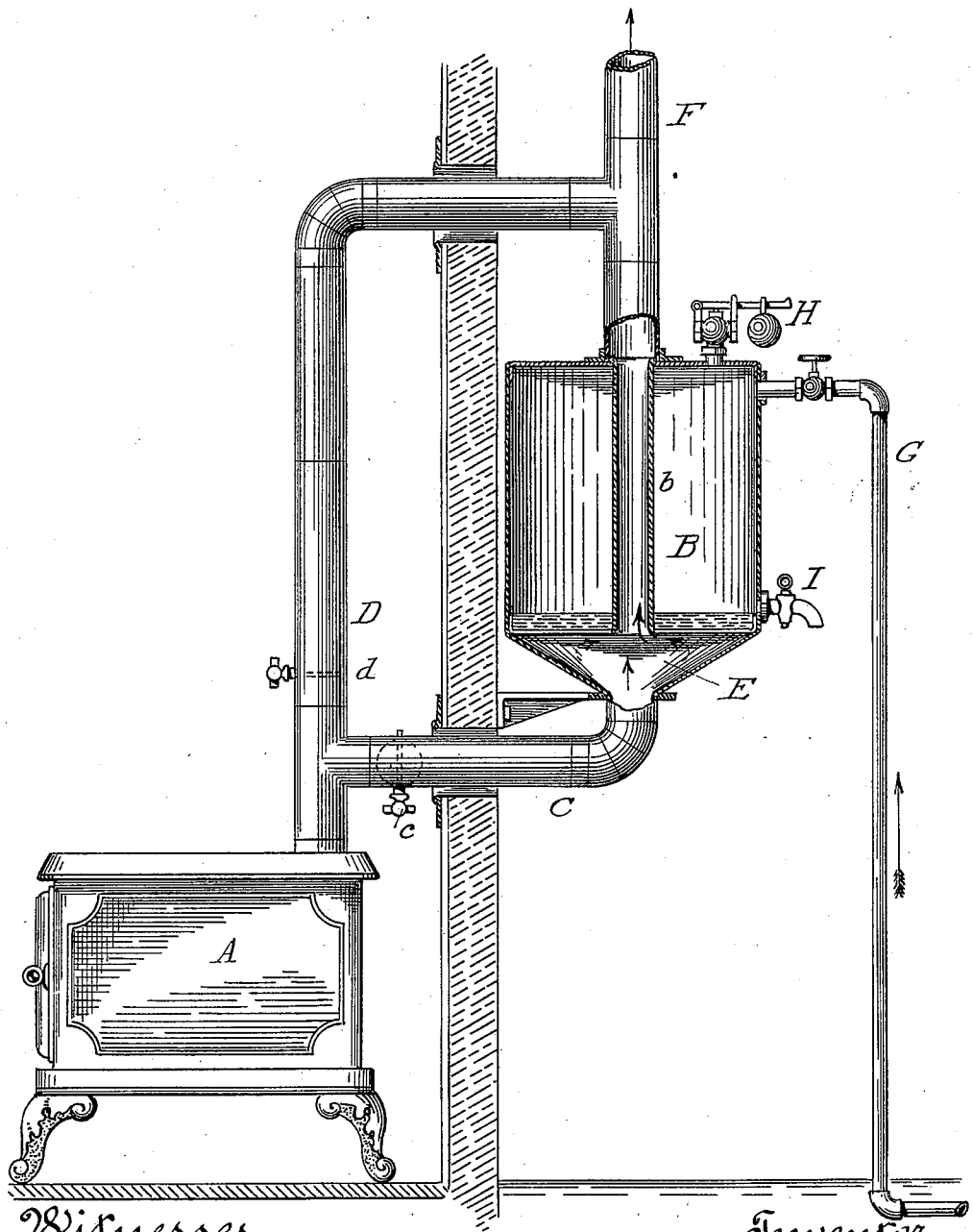

UNITED STATES PATENT OFFICE.

WILLIAM B. LIVERMORE, OF FRESNO, CALIFORNIA.

APPARATUS FOR DRAWING WATER.

SPECIFICATION forming part of Letters Patent No. 594,956, dated December 7, 1897.

Application filed January 28, 1897. Serial No. 621,088. (No model.)

*To all whom it may concern:*

Be it known that I, WILLIAM B. LIVERMORE, a citizen of the United States, residing at Fresno, in the county of Fresno and State of California, have invented certain new and useful Improvements in Apparatus for Drawing Water; and I do hereby declare that the following is a full, clear, and exact description thereof.

My invention relates to the raising of water and the affording of a water-supply in cases where no natural water-pressure exists; and it comprises a simple apparatus for such purpose.

The object of the invention is to provide simple means for obtaining water from ordinary sources of supply, such as wells or streams, without pumping or other mechanical aid.

The invention is particularly adapted to farms and country places, where water for domestic use, watering stock, &c., must either be carried or pumped to the place where it is to be used.

My apparatus operates by expelling all or part of the air from a normally-closed tank by the application of heat and then permitting the tank to cool, thereby producing a vacuum in the tank and so drawing in water from a supply connected to the tank.

This apparatus can be used in two ways—in the first by supplying steam to the tank or generating steam from a small body of water in the tank, which in its expansion expels the air and by its contraction and condensation produces the vacuum, and, secondly, without generating steam and using an empty tank, by heating the air in the tank and causing it to expand and expel a portion of its volume, then cooling and contracting the remainder to produce the vacuum, as before.

This apparatus is shown in the accompanying drawing, which gives a general view with the tank in vertical section.

A represents a heating-stove supposed to be within a building, and B is a strong tank, preferably of boiler-iron, here shown as outside the building and supported by a bracket attached to the wall. The tank is provided with one or more smoke-tubes b, which permit the products of combustion to pass through the tank. A pipe C extends from the main stovepipe D and discharges into a heating-chamber E below the bottom of the tank. Dampers c and d are placed in the pipes C and D in order that the direction of the products of combustion can be controlled.

F is an escape-pipe for the smoke, which is conveniently connected both to the main smoke-pipe and the tube b.

A water-supply pipe G enters the tank and is connected to a well, stream, reservoir, or other source of supply.

H is an ordinary safety-valve adapted to be opened by pressure from within the tank and to close automatically.

I is a cock, preferably placed a little above the bottom of the tank in order that a small residuum of water may be left in such tank when it is emptied to the level of the cock.

It will be understood that the heater may be of any desired kind or style, as its construction forms no part of my invention. Frequently it will be an ordinary kitchen-stove, employed for the usual purposes, but having the connections with the water-tank, as before described. When it is desired to draw water into the tank B, the damper c is opened, permitting products of combustion to pass into the heating-chamber E and through the smoke tube or tubes in the tank, thoroughly heating the tank, and particularly its bottom plate. If now there is a shallow body of water in the tank, as shown in the drawing, steam will be generated, which will expand in the tank and drive the air out through the safety-valve until the volume of steam fills the tank. The damper c is now closed, and the steam begins to cool, contract, and condense. The safety-valve closes, and into the vacuum formed cold water is drawn through the pipe G in an amount proportionate to the volume of air expelled. The tank is now a water-reservoir for either cold or hot water, since by opening the damper C the tank and its contents can be heated to any desired extent. If the tank be empty when the heat is first applied, the same result is produced by the heating and expansion of the cold air in the tank, the escape of a portion of its volume through the valve and the contraction of the remainder when the heat is cut off producing a vacuum, as before, and drawing in water through the supply-pipe.

It is not always necessary to use a safety-valve, although I prefer to make one a permanent attachment to the tank. If the well or other water-supply should be close to the tank, the air could be forced out through the supply-pipe. If the supply is at a distance, however, the air forced into the pipe G would cool and stand in the pipe and interfere with the successful formation and operation of the vacuum. In such cases, therefore, an automatically-closing valve opening to internal pressure will be used to obtain the best results.

I do not limit myself to the exact details of construction herein described and shown, since within the limits of the following claims my device is capable of modification without departing from the spirit of the invention.

What I claim is—

1. In an apparatus for drawing water and in combination, a heater, a discharge-pipe for the products of combustion, a tank, a heating-chamber adjacent to the tank and communicating with said discharge-pipe, a valve or damper for cutting off the supply of heat, a smoke-tube passing through the tank from the heating-chamber whereby the air or water within the tank is heated, a water-supply pipe entering the tank, and an exit from said tank, substantially as described.

2. In an apparatus for drawing water, a heater, a smoke-pipe leading from said heater, and having a damper, a heating-chamber into which said smoke-pipe extends, a tank supported above said heating-chamber, a smoke-tube extending from the heating-chamber through said tank, an escape-valve on said tank opened by internal pressure and automatically closed, and a water-supply pipe entering said tank, substantially as described.

3. In an apparatus for drawing water, a heater having a smoke-pipe provided with a damper, a branch extending from said smoke-pipe and having a damper, a tank having a smoke-tube communicating with said branch whereby the products of combustion from the heater pass through said tank, an air-escape from the tank and a water-supply pipe entering the tank, substantially as described.

In testimony whereof I have affixed my signature, in presence of two witnesses, this 15th day of January, 1897.

WILLIAM B. LIVERMORE.

Witnesses:
A. A. SMITH,
W. A. HOLMES.